United States Patent
Pan et al.

(10) Patent No.: US 9,573,825 B2
(45) Date of Patent: Feb. 21, 2017

(54) ADVANCED TREATMENT METHOD FOR BIOCHEMICAL TAIL WATER OF COKING WASTEWATER

(71) Applicant: NANJING UNIVERSITY, Nanjing, Jiangsu (CN)

(72) Inventors: Bingcai Pan, Jiangsu (CN); Wenlan Yang, Jiangsu (CN); Lu Lv, Jiangsu (CN); Weiming Zhang, Jiangsu (CN); Yingnan Jiang, Jiangsu (CN)

(73) Assignee: NANJING UNIVERSITY, Nanjing, Jiangsu (CN)

( * ) Notice: Subject to any disclaimer, the term of this patent is extended or adjusted under 35 U.S.C. 154(b) by 226 days.

(21) Appl. No.: 14/380,010

(22) PCT Filed: Oct. 23, 2012

(86) PCT No.: PCT/CN2012/083369
§ 371 (c)(1),
(2) Date: Dec. 4, 2014

(87) PCT Pub. No.: WO2013/123780
PCT Pub. Date: Aug. 29, 2013

(65) Prior Publication Data
US 2015/0076070 A1 Mar. 19, 2015

(30) Foreign Application Priority Data
Feb. 21, 2012 (CN) .......................... 2012 1 0039460

(51) Int. Cl.
*C02F 1/56* (2006.01)
*C02F 1/28* (2006.01)
*C02F 1/52* (2006.01)
*C02F 103/36* (2006.01)

(52) U.S. Cl.
CPC .............. *C02F 1/285* (2013.01); *C02F 1/288* (2013.01); *C02F 1/5245* (2013.01); *C02F 1/56* (2013.01); *C02F 2103/365* (2013.01); *C02F 2303/16* (2013.01)

(58) Field of Classification Search
None
See application file for complete search history.

(56) References Cited

U.S. PATENT DOCUMENTS

| | | | |
|---|---|---|---|
| 3,847,807 A | 11/1974 | Herman et al. | |
| 4,132,636 A * | 1/1979 | Iwase | C01C 3/12 210/612 |
| 4,732,887 A * | 3/1988 | Obanawa | B01D 53/02 210/679 |
| 2006/0283806 A1 * | 12/2006 | Kojima | C02F 1/5245 210/725 |
| 2007/0039895 A1 * | 2/2007 | Sengupta | B01J 49/0073 210/723 |
| 2011/0155669 A1 * | 6/2011 | Pan | C02F 1/288 210/663 |

FOREIGN PATENT DOCUMENTS

| | | |
|---|---|---|
| CN | 1781859 A | 6/2006 |
| CN | 101077815 A | 11/2007 |
| CN | 101186357 A | 5/2008 |

OTHER PUBLICATIONS

Li et al., Machine Translation of CN101077815A, published 2007, 12 total pages.*
Pan et al., "Development of polymeric and polymer-based hybrid adsorbents for pollutants removal from waters", Chemical Engineering Journal, 151, (2009), pp. 19-29, 11 total pages.*
Xie et al., Machine Translation of CN1648058A, published 2005, 28 total pages.*

* cited by examiner

Primary Examiner — Bobby Ramdhanie
Assistant Examiner — Jonathan Peo
(74) Attorney, Agent, or Firm — Novick, Kim & Lee, PLLC; Allen Xue

(57) ABSTRACT

The present invention discloses a method for advanced treatment of bio-treated coking wastewater. It employs polymeric ferric sulfate (PFS) and polyacrylamide (PAM) as the flocculant for the pre-treatment of bio-treated effluent. After the process of precipitation and filtration, the effluent is guided through an adsorption column filled with environmentally-friendly nano-composites whereby the advanced treatment of the bio-treated coking wastewater is achieved. When the absorption process reaches the breakthrough point, the adsorption operation will be stopped and sodium hydroxide solution is used as the desorption reagent for regenerating the nano-composites. The high-concentrated component of the desorption liquid is sent out for incineration or production of coal water slurry, meanwhile the low-concentrated component of the desorption liquid is used to prepare sodium hydroxide solution for the adsorption process of the next batch.

14 Claims, No Drawings

ADVANCED TREATMENT METHOD FOR BIOCHEMICAL TAIL WATER OF COKING WASTEWATER

BACKGROUND OF THE INVENTION

Technical Field

The present invention relates to the technical field of sewage treatment, more specifically to a method for advanced treatment of bio-treated coking wastewater.

Description of Related Art

Coking wastewater is generated in the high-temperature carbonization of raw coal, coal gas purification and refining process of chemical products. The constituents in coking wastewater vary greatly in accordance with the nature of raw coal, carbonization temperature and recovering modes of chemical byproducts. Coking wastewater usually contains ammonia nitrogen, cyanides, thiocyanides, phenols and other pollutants such as polycyclic aromatic hydrocarbons and heterocyclic compounds containing nitrogen, oxygen and sulfur. These persistent pollutants are very harmful to the ecological system, in addition, most of polycyclic and heterocyclic compounds are subject to constant transformation and are carcinogenic by nature. Therefore, treatment of coking wastewater is a tough challenge for all countries. At present, most coking plants discharge coking wastewater after such processes as de-phenol pretreatment and biological treatment, the biological oxygen demand (BOD) in the effluent treated in this way can reach the B-level of [Chinese National] *Integrated Wastewater Discharge Standard* (GB8978-1996), but the chromaticity and the chemical oxygen demand (COD) therein usually exceed the national standards. Though advanced oxidation processes and active carbon adsorption can effectively solve the above problems, they are limited in use due to high operating cost and small treatment capacity. Thus, seeking a simple, low-cost and effect-stable technology for the advanced treatment of coking wastewater becomes a primary yet challenging task.

In recent years, iron oxide and manganese oxide are widely used in removing heavy metals (Zn, Cd, Ni, Pb, etc.) and inorganic ion pollutants (arsenate, fluorinion, perchlorate, etc.) in solution, which have been reported in various literature and patents. Some organics in the wastewater can form coordinated complexes with hydrated ferric oxide and hydrated manganese oxide, which makes it possible to remove organic pollutants from coking wastewater by means of nano-composite adsorbents made of iron oxide or manganese oxide. However, up-to-standard discharge of coking wastewater that has been treated as such is still a technical difficulty.

BRIEF SUMMARY OF THE INVENTION

1. Technical Problems to be Solved

In order to solve the problem existing in prior arts, viz the concentration of pollutants contained in bio-treated coking wastewater exceeds the national discharge standard, the present invention provides a method for advanced treatment of bio-treated coking wastewater. It can effectively reduce COD and chromaticity in the effluent down to less than 70 mg/L and 20 times respectively with relatively low cost.

2. Technical Solutions

The technical solutions disclosed in the present invention are as follows:

A method for advanced treatment of bio-treated coking wastewater, comprising the following steps:

(A) Guide the effluent from the secondary sedimentation tank of a coking wastewater bio-treatment plant to a flocculation mixer, add in polymeric ferric sulfate (PFS) and polyacrylamide (PAM), and make the raw wastewater mix thoroughly with the flocculant. The PFS and PAM are added in the form of solution; the PFS solution has a mass concentration of 2-10%, the dosage is 5-25 L/m$^3$; the PAM solution has a mass concentration of 0.05-0.2%, and the dosage is 5-20 L/m$^3$. The rotational speed of the stirrer in the flocculation mixer is 200-300 rpm, and the mixing time is 2-6 min.

(B) Guide the mixed solution obtained from step (A) into a flocculation reactor to generate a flocculation reaction, form large coagulated particles through such physical and chemical processes as double-layer compression, adsorption-charge neutralization and net retentation, and remove pollutants including colloidal particles and insoluble COD in the wastewater. The rotational speed of the stirrer in the flocculation reactor is 50-100 rpm, and the mixing time is 20-60 min.

(C) Guide the mixed solution obtained through the flocculation reaction in step (B) into a settling tank to separate the precipitated solids from the liquid. The settling time is 30-60 min.

(D) Filter the supernatant obtained in step (C), and guide the filtrate to pass through an adsorption column filled with nano-composites at a flow rate of 4-10 BV/h (BV represents the bed volume) such that the non-biodegradable organic pollutants and some of inorganic pollutants are effectively adsorbed by the nano-composites. Keep the treatment capacity at 500-1,000 BV each batch and the post-treatment COD and chromaticity in the effluent is less than 70 mg/L and 20 times respectively.

In the present invention, the matrix of the nano-composites is quaternized spherical polystyrene with nano-size pore structure, loaded with iron oxide or manganese oxide nano-particles. It can be either the composite NDA-HMO (produced by Jiangsu Yongtai Environmental Protection Scientific Co., Ltd.) loaded with manganese oxide nano-particles or the composite NDA-HFO (produced by Jiangsu Yongtai Environmental Protection Scientific Co., Ltd.) loaded with iron oxide nano-particles, wherein the composite NDA-HMO loaded with manganese oxide nano-particles is preferred.

(E) When the adsorption process reaches the breakthrough point (COD exceeding 70 mg/L or the chromaticity exceeding 20 times), the adsorption operation will be stopped, and a desorption process is initiated by using 2-10% sodium hydroxide solution as the desorption reagent at the flow rate of 0.5-2 BV/h at the temperature of 40-85° C.

(F) The high-concentrated desorption liquid obtained in step (E) is further condensed and then transferred out for incineration or production of coal water slurry, meanwhile the low-concentrated desorption liquid obtained in the same step is used to prepare sodium hydroxide solution for the desorption process of the next batch.

Common methods for advanced treatment of coking wastewater can only reduce COD to approximately 100 mg/L. They are also low in removal efficiency, poor in decolorization and small in treatment capacity. In contrast, the method disclosed in the present invention shows excellent efficiency in removing COD and color due to high selectivity, high adsorption efficiency and the Donnas membrane effect of nano-oxides adopted herein in removing monocyclic or polycyclic aromatic compounds, heterocyclic compounds containing nitrogen, oxygen or sulfur, and phenols as well as highly reductive inorganic compounds such as cyanides and thiocyanides.

3. Beneficial Effects

The present invention has the following beneficial effects: 1. After advanced treatment, the COD in the bio-treated coking wastewater can be decreased from 160 mg/L to below 70 mg/L, and the chromaticity from 80 times to below 20 times. The data meet the A-level standard of the *Integrated Wastewater Discharge Standard* (GB8978-1996); 2. Large treatment capacity; 500-1,000 BV bio-treated coking wastewater can be treated with satisfactory treatment effect; 3. The nano-composites can be employed for repeated use with stable removal efficiency due to its outstanding regenerative properties and high mechanical strength. In conclusion, the advantages of the present invention include simpler operation procedure and lower operating cost in contrast with prior arts, which consequently embodies not only significant environmental benefits but also promising market potential.

DETAILED DESCRIPTION OF THE INVENTION

The present invention is further described with the following embodiments.

Embodiment 1

Guide the effluent (COD: 160 mg/L; chromaticity: 80 times) from the secondary sedimentation tank of a coking wastewater bio-treatment plant into a flocculation mixer; add 10 L/m³ polymeric ferric sulfate (PFS) with a mass concentration of 5% and 10 L/m³ polyacrylamide (PAM) with a mass concentration of 0.1% into the flocculation mixer consecutively; mix the substances for 2 min with a stirrer at the speed of 300 rpm; then guide the mixed solution into a flocculation reactor and stir the solution with a stirrer at the speed of 50 rpm for 60 min of reaction; guide the mixed solution into a settling tank for 30 min of settling.

Fill 5 mL (approximately 3.8 g) nano-composite NDA-HMO into a jacketed glass adsorption column (16×160 mm). Filter the supernatant obtained through the flocculation and settling processes and guide the filtrate through the nano-composite adsorption bed at the flow rate of 50 mL/h at the temperature of 10±5° C.; the treatment capacity is kept at 4,000 mL/batch. After the adsorption process, the COD in the effluent is reduced to 61 mg/L, and the chromaticity is reduced to below 20 times.

Consecutively guide 5 mL sodium hydroxide solution with a mass concentration of 6%, 5 mL sodium hydroxide solution with a mass concentration of 1% and 20 mL tap water through the nano-composite adsorption bed at the flow rate of 5 mL/h at the temperature of 45±5° C. for desorption. The high-concentrated desorption liquid is sent out for incineration or production of coal water slurry, meanwhile the low-concentrated adsorption liquid is used to prepare sodium hydroxide solution for the adsorption process of the next batch.

Embodiment 2

Guide the effluent (COD: 160 mg/L; chromaticity: 80 times) from the secondary sedimentation tank of a coking wastewater bio-treatment plant into a flocculation mixer; add 5 L/m³ polymeric ferric sulfate (PFS) with a mass concentration of 10% and 20 L/m³ polyacrylamide (PAM) with a mass concentration of 0.05% into the flocculation mixer consecutively; mix the substances for 4 min with a stirrer at the speed of 250 rpm; then guide the mixed solution into a flocculation reactor and stir the solution with a stirrer at the speed of 60 rpm for 50 min of reaction; guide the mixed solution into a settling tank for 40 min of settling.

Fill 10 mL (approximately 7.5 g) nano-composite NDA-HMO into a jacketed glass adsorption column (16×160 mm). Filter the supernatant obtained through the flocculation and settling processes and guide the filtrate through the nano-composite adsorption bed at the flow rate of 100 mL/h at the temperature of 25±5° C.; the treatment capacity is kept at 8,000 mL/batch. After the adsorption process, the COD in the effluent is reduced to 65 mg/L, and the chromaticity is reduced to below 20 times.

Consecutively guide 10 mL sodium hydroxide solution with a mass concentration of 6%, 10 mL sodium hydroxide solution with a mass concentration of 2% and 40 mL tap water through the nano-composite adsorption bed at the flow rate of 10 mL/h at the temperature of 55±5° C. for desorption. The high-concentrated desorption liquid is sent out for incineration or production of coal water slurry, meanwhile the low-concentrated adsorption liquid is used to prepare sodium hydroxide solution for the adsorption process of the next batch.

Embodiment 3

Guide the effluent (COD: 160 mg/L; chromaticity: 80 times) from the secondary sedimentation tank of a coking wastewater bio-treatment plant into a flocculation mixer; add 12 L/m³ polymeric ferric sulfate (PFS) with a mass concentration of 4% and 6.5 L/m³ polyacrylamide (PAM) with a mass concentration of 0.15% into the flocculation mixer consecutively; mix the substances for 6 min with a stirrer at the speed of 200 rpm; then guide the mixed solution into a flocculation reactor and stir the solution with a stirrer at the speed of 70 rpm for 40 min of reaction; guide the mixed solution into a settling tank for 50 min of settling.

Fill 50 mL (approximately 37.5 g) nano-composite NDA-HMO into a jacketed glass adsorption column (32×260 mm). Filter the supernatant obtained through the flocculation and settling processes and guide the filtrate through the nano-composite adsorption bed at the flow rate of 400 mL/h at the temperature of 20±5° C.; the treatment capacity is kept at 50,000 mL/batch. After the adsorption process, the COD in the effluent is reduced to 64 mg/L, and the chromaticity is reduced to below 20 times.

Consecutively guide 50 mL sodium hydroxide solution with a mass concentration of 8%, 50 mL sodium hydroxide solution with a mass concentration of 2% and 200 mL tap water through the nano-composite adsorption bed at the flow rate of 50 mL/h at the temperature of 60±5° C. for desorption. The high-concentrated desorption liquid is sent out for incineration or production of coal water slurry, meanwhile the low-concentrated adsorption liquid is used to prepare sodium hydroxide solution for the adsorption process of the next batch.

Embodiment 4

Guide the effluent (COD: 160 mg/L; chromaticity: 80 times) from the secondary sedimentation tank of a coking wastewater bio-treatment plant into a flocculation mixer; add 8 L/m³ polymeric ferric sulfate (PFS) with a mass concentration of 6% and 12 L/m³ polyacrylamide (PAM) with a mass concentration of 0.08% into the flocculation mixer consecutively; mix the substances for 2 min with a stirrer at the speed of 300 rpm; then guide the mixed solution into a flocculation reactor and stir the solution with a stirrer at the speed of 80 rpm for 30 min of reaction; guide the mixed solution into a settling tank for 60 min of settling.

Fill 100 mL (approximately 75 g) nano-composite NDA-HMO into a jacketed glass adsorption column (32×260 mm). Filter the supernatant obtained through the flocculation and settling processes and guide the filtrate through the nano-composite adsorption bed at the flow rate of 600 mL/h at the temperature of 15±5° C.; the treatment capacity is kept at 80,000 mL/batch. After the adsorption process, the COD in the effluent is reduced to 62 mg/L, and the chromaticity is reduced to below 20 times.

Consecutively guide 100 mL sodium hydroxide solution with a mass concentration of 10%, 100 mL sodium hydroxide solution with a mass concentration of 2% and 400 mL tap water through the nano-composite adsorption bed at the flow rate of 100 mL/h at the temperature of 70±5° C. for desorption. The high-concentrated desorption liquid is sent out for incineration or production of coal water slurry, meanwhile the low-concentrated adsorption liquid is used to prepare sodium hydroxide solution for the adsorption process of the next batch.

Embodiment 5

Guide the effluent (COD: 160 mg/L; chromaticity: 80 times) from the secondary sedimentation tank of a coking wastewater bio-treatment plant into a flocculation mixer; add 6.5 L/m$^3$ polymeric ferric sulfate (PFS) with a mass concentration of 8% and 8 L/m$^3$ polyacrylamide (PAM) with a mass concentration of 0.12% into the flocculation mixer consecutively; mix the substances for 4 min with a stirrer at the speed of 250 rpm; then guide the mixed solution into a flocculation reactor and stir the solution with a stirrer at the speed of 90 rpm for 30 min of reaction; guide the mixed solution into a settling tank for 50 min of settling.

Fill 200 mL (approximately 150 g) nano-composite NDA-HMO into a jacketed glass adsorption column (64×320 mm). Filter the supernatant obtained through the flocculation and settling processes and guide the filtrate through the nano-composite adsorption bed at the flow rate of 1000 mL/h at the temperature of 20±5° C.; the treatment capacity is kept at 200,000 mL/batch. After the adsorption process, the COD in the effluent is reduced to 66 mg/L, and the chromaticity is reduced to below 20 times.

Consecutively guide 200 mL sodium hydroxide solution with a mass concentration of 8%, 200 mL sodium hydroxide solution with a mass concentration of 3% and 800 mL tap water through the nano-composite adsorption bed at the flow rate of 200 mL/h at the temperature of 75±5° C. for desorption. The high-concentrated desorption liquid is sent out for incineration or production of coal water slurry, meanwhile the low-concentrated adsorption liquid is used to prepare sodium hydroxide solution for the adsorption process of the next batch.

Embodiment 6

Guide the effluent (COD: 160 mg/L; chromaticity: 80 times) from the secondary sedimentation tank of a coking wastewater bio-treatment plant into a flocculation mixer; add 25 L/m$^3$ polymeric ferric sulfate (PFS) with a mass concentration of 2% and 5 L/m$^3$ polyacrylamide (PAM) with a mass concentration of 0.2% into the flocculation mixer consecutively; mix the substances for 5 min with a stirrer at the speed of 200 rpm; then guide the mixed solution into a flocculation reactor and stir the solution with a stirrer at the speed of 100 rpm for 30 min of reaction; guide the mixed solution into a settling tank for 60 min of settling.

Fill 500 mL (approximately 375 g) nano-composite NDA-HMO into a jacketed glass adsorption column (100×360 mm). Filter the supernatant obtained through the flocculation and settling processes and guide the filtrate through the nano-composite adsorption bed at the flow rate of 2000 mL/h at the temperature of 10±5° C.; the treatment capacity is kept at 400,000 mL/batch. After the adsorption process, the COD in the effluent is reduced to 59 mg/L, and the chromaticity is reduced to below 20 times.

Consecutively guide 500 mL sodium hydroxide solution with a mass concentration of 10%, 500 mL sodium hydroxide solution with a mass concentration of 3% and 2000 mL tap water through the nano-composite adsorption bed at the flow rate of 500 mL/h at the temperature of 80±5° C. for desorption. The high-concentrated desorption liquid is sent out for incineration or production of coal water slurry, meanwhile the low-concentrated adsorption liquid is used to prepare sodium hydroxide solution for the adsorption process of the next batch.

Embodiment 7

Guide the effluent (COD: 160 mg/L; chromaticity: 80 times) from the secondary sedimentation tank of a coking wastewater bio-treatment plant into a flocculation mixer; add 10 L/m$^3$ polymeric ferric sulfate (PFS) with a mass concentration of 5% and 10 L/m$^3$ polyacrylamide (PAM) with a mass concentration of 0.1% into the flocculation mixer consecutively; mix the substances for 2 min with a stirrer at the speed of 300 rpm; then guide the mixed solution into a flocculation reactor and stir the solution with a stirrer at the speed of 50 rpm for 60 min of reaction; guide the mixed solution into a settling tank for 30 min of settling.

Fill 10 mL (approximately 7.5 g) nano-composite NDA-HMO into a jacketed glass adsorption column (16×160 mm). Filter the supernatant obtained through the flocculation and settling processes and guide the filtrate through the nano-composite adsorption bed at the flow rate of 100 mL/h at the temperature of 25±5° C.; the treatment capacity is kept at 8,000 mL/batch. After the adsorption process, the COD in the effluent is reduced to 65 mg/L, and the chromaticity is reduced to below 20 times.

Consecutively guide 10 mL sodium hydroxide solution with a mass concentration of 6%, 10 mL sodium hydroxide solution with a mass concentration of 2% and 40 mL tap water through the nano-composite adsorption bed at the flow rate of 10 mL/h at the temperature of 55±5° C. for desorption. The high-concentrated desorption liquid is sent out for incineration or production of coal water slurry, meanwhile the low-concentrated adsorption liquid is used to prepare sodium hydroxide solution for the adsorption process of the next batch.

Embodiment 8

Guide the effluent (COD: 160 mg/L; chromaticity: 80 times) from the secondary sedimentation tank of a coking wastewater bio-treatment plant into a flocculation mixer; add 5 L/m$^3$ polymeric ferric sulfate (PFS) with a mass concentration of 10% and 20 L/m$^3$ polyacrylamide (PAM) with a mass concentration of 0.05% into the flocculation mixer consecutively; mix the substances for 4 min with a stirrer at the speed of 250 rpm; then guide the mixed solution into a flocculation reactor and stir the solution with a stirrer at the speed of 60 rpm for 50 min of reaction; guide the mixed solution into a settling tank for 40 min of settling.

Fill 50 mL (approximately 37.5 g) nano-composite NDA-HMO into a jacketed glass adsorption column (32×260 mm). Filter the supernatant obtained through the flocculation and settling processes and guide the filtrate through the nano-composite adsorption bed at the flow rate of 400 mL/h at the temperature of 20±5° C.; the treatment capacity is kept at 50,000 mL/batch. After the adsorption process, the COD in the effluent is reduced to 64 mg/L, and the chromaticity is reduced to below 20 times.

Consecutively guide 50 mL sodium hydroxide solution with a mass concentration of 8%, 50 mL sodium hydroxide solution with a mass concentration of 2% and 200 mL tap water through the nano-composite adsorption bed at the flow rate of 50 mL/h at the temperature of 55±5° C. for desorption. The high-concentrated desorption liquid is sent out for incineration or production of coal water slurry, meanwhile the low-concentrated adsorption liquid is used to prepare sodium hydroxide solution for the adsorption process of the next batch.

Embodiment 9

Guide the effluent (COD: 160 mg/L; chromaticity: 80 times) from the secondary sedimentation tank of a coking wastewater bio-treatment plant into a flocculation mixer; add 12 L/m$^3$ polymeric ferric sulfate (PFS) with a mass concentration of 4% and 6.5 L/m$^3$ polyacrylamide (PAM) with a mass concentration of 0.15% into the flocculation mixer consecutively; mix the substances for 6 min with a stirrer at the speed of 200 rpm; then guide the mixed solution into a flocculation reactor and stir the solution with a stirrer at the speed of 70 rpm for 40 min of reaction; guide the mixed solution into a settling tank for 50 min of settling.

Fill 100 mL (approximately 75 g) nano-composite NDA-HFO into a jacketed glass adsorption column (32×260 mm). Filter the supernatant obtained through the flocculation and settling processes and guide the filtrate through the nano-composite adsorption bed at the flow rate of 600 mL/h at the temperature of 15±5° C.; the treatment capacity is kept at 80,000 mL/batch. After the adsorption process, the COD in the effluent is reduced to 62 mg/L, and the chromaticity is reduced to below 20 times.

Consecutively guide 100 mL sodium hydroxide solution with a mass concentration of 10%, 100 mL sodium hydroxide solution with a mass concentration of 2% and 400 mL tap water through the nano-composite adsorption bed at the flow rate of 100 mL/h at the temperature of 70±5° C. for desorption. The high-concentrated desorption liquid is sent out for incineration or production of coal water slurry, meanwhile the low-concentrated adsorption liquid is used to prepare sodium hydroxide solution for the adsorption process of the next batch.

Embodiment 10

Guide the effluent (COD: 160 mg/L; chromaticity: 80 times) from the secondary sedimentation tank of a coking wastewater bio-treatment plant into a flocculation mixer; add 8 L/m$^3$ polymeric ferric sulfate (PFS) with a mass concentration of 6% and 12 L/m$^3$ polyacrylamide (PAM) with a mass concentration of 0.08% into the flocculation mixer consecutively; mix the substances for 2 min with a stirrer at the speed of 300 rpm; then guide the mixed solution into a flocculation reactor and stir the solution with a stirrer at the speed of 80 rpm for 30 min of reaction; guide the mixed solution into a settling tank for 60 min of settling.

Fill 200 mL (approximately 150 g) nano-composite NDA-HFO into a jacketed glass adsorption column (64×320 mm). Filter the supernatant obtained through the flocculation and settling processes and guide the filtrate through the nano-composite adsorption bed at the flow rate of 1000 mL/h at the temperature of 20±5° C.; the treatment capacity is kept at 200,000 mL/batch. After the adsorption process, the COD in the effluent is reduced to 66 mg/L, and the chromaticity is reduced to below 20 times.

Consecutively guide 200 mL sodium hydroxide solution with a mass concentration of 8%, 200 mL sodium hydroxide solution with a mass concentration of 3% and 800 mL tap water through the nano-composite adsorption bed at the flow rate of 200 mL/h at the temperature of 75±5° C. for desorption. The high-concentrated desorption liquid is sent out for incineration or production of coal water slurry, meanwhile the low-concentrated adsorption liquid is used to prepare sodium hydroxide solution for the adsorption process of the next batch.

Embodiment 11

Guide the effluent (COD: 160 mg/L; chromaticity: 80 times) from the secondary sedimentation tank of a coking wastewater bio-treatment plant into a flocculation mixer; add 6.5 L/m$^3$ polymeric ferric sulfate (PFS) with a mass concentration of 8% and 8 L/m$^3$ polyacrylamide (PAM) with a mass concentration of 0.12% into the flocculation mixer consecutively; mix the substances for 4 min with a stirrer at the speed of 250 rpm; then guide the mixed solution into a flocculation reactor and stir the solution with a stirrer at the speed of 90 rpm for 30 min of reaction; guide the mixed solution into a settling tank for 50 min of settling.

Fill 500 mL (approximately 375 g) nano-composite NDA-HMO into a jacketed glass adsorption column (100×360 mm). Filter the supernatant obtained through the flocculation and settling processes and guide the filtrate through the nano-composite adsorption bed at the flow rate of 2000 mL/h at the temperature of 10±5° C.; the treatment capacity is kept at 400,000 mL/batch. After the adsorption process, the COD in the effluent is reduced to 59 mg/L, and the chromaticity is reduced to below 20 times.

Consecutively guide 500 mL sodium hydroxide solution with a mass concentration of 10%, 500 mL sodium hydroxide solution with a mass concentration of 3% and 2000 mL tap water through the nano-composite adsorption bed at the flow rate of 500 mL/h at the temperature of 80±5° C. for desorption. The high-concentrated desorption liquid is sent out for incineration or production of coal water slurry, meanwhile the low-concentrated adsorption liquid is used to prepare sodium hydroxide solution for the adsorption process of the next batch.

Embodiment 12

Guide the effluent (COD: 160 mg/L; chromaticity: 80 times) from the secondary sedimentation tank of a coking wastewater bio-treatment plant into a flocculation mixer; add 10 L/m$^3$ polymeric ferric sulfate (PFS) with a mass concentration of 5% and 10 L/m$^3$ polyacrylamide (PAM) with a mass concentration of 0.1% into the flocculation mixer consecutively; mix the substances for 2 min with a stirrer at the speed of 300 rpm; then guide the mixed solution into a flocculation reactor and stir the solution with a stirrer at the speed of 50 rpm for 60 min of reaction; guide the mixed solution into a settling tank for 30 min of settling.

Fill 50 mL (approximately 37.5 g) nano-composite NDA-HFO into a jacketed glass adsorption column (32×260 mm). Filter the supernatant obtained through the flocculation and settling processes and guide the filtrate through the nano-composite adsorption bed at the flow rate of 400 mL/h at the temperature of 20±5° C.; the treatment capacity is kept at 50,000 mL/batch. After the adsorption process, the COD in the effluent is reduced to 64 mg/L, and the chromaticity is reduced to below 20 times.

Consecutively guide 50 mL sodium hydroxide solution with a mass concentration of 8%, 50 mL sodium hydroxide solution with a mass concentration of 2% and 200 mL tap water through the nano-composite adsorption bed at the flow rate of 50 mL/h at the temperature of 60±5° C. for desorption. The high-concentrated desorption liquid is sent out for incineration or production of coal water slurry, meanwhile the low-concentrated adsorption liquid is used to prepare sodium hydroxide solution for the adsorption process of the next batch.

Embodiment 13

Guide the effluent (COD: 160 mg/L; chromaticity: 80 times) from the secondary sedimentation tank of a coking wastewater bio-treatment plant into a flocculation mixer; add 5 L/m$^3$ polymeric ferric sulfate (PFS) with a mass concentration of 10% and 20 L/m$^3$ polyacrylamide (PAM) with a mass concentration of 0.05% into the flocculation mixer consecutively; mix the substances for 4 min with a stirrer at the speed of 250 rpm; then guide the mixed solution into a flocculation reactor and stir the solution with a stirrer at the speed of 60 rpm for 50 min of reaction; guide the mixed solution into a settling tank for 40 min of settling.

Fill 100 mL (approximately 75 g) nano-composite NDA-HMO into a jacketed glass adsorption column (32×260 mm). Filter the supernatant obtained through the flocculation and settling processes and guide the filtrate through the nano-composite adsorption bed at the flow rate of 600 mL/h at the temperature of 15±5° C.; the treatment capacity is kept at 80,000 mL/batch. After the adsorption process, the COD in the effluent is reduced to 62 mg/L, and the chromaticity is reduced to below 20 times.

Consecutively guide 100 mL sodium hydroxide solution with a mass concentration of 10%, 100 mL sodium hydroxide solution with a mass concentration of 2% and 400 mL tap water through the nano-composite adsorption bed at the flow rate of 100 mL/h at the temperature of 70±5° C. for desorption. The high-concentrated desorption liquid is sent out for incineration or production of coal water slurry, meanwhile the low-concentrated adsorption liquid is used to prepare sodium hydroxide solution for the adsorption process of the next batch.

Embodiment 14

Guide the effluent (COD: 160 mg/L; chromaticity: 80 times) from the secondary sedimentation tank of a coking wastewater bio-treatment plant into a flocculation mixer; add 12 L/m$^3$ polymeric ferric sulfate (PFS) with a mass concentration of 4% and 6.5 L/m$^3$ polyacrylamide (PAM) with a mass concentration of 0.15% into the flocculation mixer consecutively; mix the substances for 6 min with a stirrer at the speed of 200 rpm; then guide the mixed solution into a flocculation reactor and stir the solution with a stirrer at the speed of 70 rpm for 40 min of reaction; guide the mixed solution into a settling tank for 50 min of settling.

Fill 200 mL (approximately 150 g) nano-composite NDA-HMO into a jacketed glass adsorption column (64×320 mm). Filter the supernatant obtained through the flocculation and settling processes and guide the filtrate through the nano-composite adsorption bed at the flow rate of 1000 mL/h at the temperature of 20±5° C.; the treatment capacity is kept at 200,000 mL/batch. After the adsorption process, the COD in the effluent is reduced to 66 mg/L, and the chromaticity is reduced to below 20 times.

Consecutively guide 200 mL sodium hydroxide solution with a mass concentration of 8%, 200 mL sodium hydroxide solution with a mass concentration of 3% and 800 mL tap water through the nano-composite adsorption bed at the flow rate of 200 mL/h at the temperature of 75±5° C. for desorption. The high-concentrated desorption liquid is sent out for incineration or production of coal water slurry, meanwhile the low-concentrated adsorption liquid is used to prepare sodium hydroxide solution for the adsorption process of the next batch.

Embodiment 15

Guide the effluent (COD: 160 mg/L; chromaticity: 80 times) from the secondary sedimentation tank of a coking wastewater bio-treatment plant into a flocculation mixer; add 8 L/m$^3$ polymeric ferric sulfate (PFS) with a mass concentration of 6% and 12 L/m$^3$ polyacrylamide (PAM) with a mass concentration of 0.08% into the flocculation mixer consecutively; mix the substances for 2 min with a stirrer at the speed of 300 rpm; then guide the mixed solution into a flocculation reactor and stir the solution with a stirrer at the speed of 80 rpm for 30 min of reaction; guide the mixed solution into a settling tank for 60 min of settling.

Fill 500 mL (approximately 375 g) nano-composite NDA-HFO into a jacketed glass adsorption column (100×360 mm). Filter the supernatant obtained through the flocculation and settling processes and guide the filtrate through the nano-composite adsorption bed at the flow rate of 2000 mL/h at the temperature of 10±5° C.; the treatment capacity is kept at 400,000 mL/batch. After the adsorption process, the COD in the effluent is reduced to 59 mg/L, and the chromaticity is reduced to below 20 times.

Consecutively guide 500 mL sodium hydroxide solution with a mass concentration of 10%, 500 mL sodium hydroxide solution with a mass concentration of 3% and 2000 mL tap water through the nano-composite adsorption bed at the flow rate of 500 mL/h at the temperature of 80±5° C. for desorption. The high-concentrated desorption liquid is sent out for incineration or production of coal water slurry, meanwhile the low-concentrated adsorption liquid is used to prepare sodium hydroxide solution for the adsorption process of the next batch.

Embodiment 16

Guide the effluent (COD: 160 mg/L; chromaticity: 80 times) from the secondary sedimentation tank of a coking wastewater bio-treatment plant into a flocculation mixer; add 10 L/m$^3$ polymeric ferric sulfate (PFS) with a mass concentration of 5% and 10 L/m$^3$ polyacrylamide (PAM) with a mass concentration of 0.1% into the flocculation mixer consecutively; mix the substances for 2 min with a stirrer at the speed of 300 rpm; then guide the mixed solution into a flocculation reactor and stir the solution with a stirrer at the speed of 50 rpm for 60 min of reaction; guide the mixed solution into a settling tank for 30 min of settling.

Fill 100 mL (approximately 75 g) nano-composite NDA-HFO into a jacketed glass adsorption column (32×260 mm). Filter the supernatant obtained through the flocculation and settling processes and guide the filtrate through the nano-composite adsorption bed at the flow rate of 600 mL/h at the temperature of 15±5° C.; the treatment capacity is kept at 80,000 mL/batch. After the adsorption process, the COD in the effluent is reduced to 62 mg/L, and the chromaticity is reduced to below 20 times.

Consecutively guide 100 mL sodium hydroxide solution with a mass concentration of 10%, 100 mL sodium hydroxide solution with a mass concentration of 2% and 400 mL tap water through the nano-composite adsorption bed at the flow rate of 100 mL/h at the temperature of 70±5° C. for desorption. The high-concentrated desorption liquid is sent out for incineration or production of coal water slurry, meanwhile the low-concentrated adsorption liquid is used to prepare sodium hydroxide solution for the adsorption process of the next batch.

Embodiment 17

Guide the effluent (COD: 160 mg/L; chromaticity: 80 times) from the secondary sedimentation tank of a coking wastewater bio-treatment plant into a flocculation mixer; add 5 L/m$^3$ polymeric ferric sulfate (PFS) with a mass concentration of 5% and 20 L/m$^3$ polyacrylamide (PAM) with a mass concentration of 0.05% into the flocculation mixer consecutively; mix the substances for 4 min with a stirrer at the speed of 250 rpm; then guide the mixed solution into a flocculation reactor and stir the solution with a stirrer at the speed of 60 rpm for 50 min of reaction; guide the mixed solution into a settling tank for 40 min of settling.

Fill 200 mL (approximately 150 g) nano-composite NDA-HMO into a jacketed glass adsorption column (64×320 mm). Filter the supernatant obtained through the flocculation and settling processes and guide the filtrate through the nano-composite adsorption bed at the flow rate of 1000 mL/h at the temperature of 20±5° C.; the treatment capacity is kept at 200,000 mL/batch. After the adsorption process, the COD in the effluent is reduced to 66 mg/L, and the chromaticity is reduced to below 20 times.

Consecutively guide 200 mL sodium hydroxide solution with a mass concentration of 8%, 200 mL sodium hydroxide solution with a mass concentration of 3% and 800 mL tap water through the nano-composite adsorption bed at the flow rate of 200 mL/h at the temperature of 75±5° C. for desorption. The high-concentrated desorption liquid is sent out for incineration or production of coal water slurry, meanwhile the low-concentrated adsorption liquid is used to prepare sodium hydroxide solution for the adsorption process of the next batch.

Embodiment 18

Guide the effluent (COD: 160 mg/L; chromaticity: 80 times) from the secondary sedimentation tank of a coking wastewater bio-treatment plant into a flocculation mixer; add 12 L/m$^3$ polymeric ferric sulfate (PFS) with a mass concentration of 4% and 6.5 L/m$^3$ polyacrylamide (PAM) with a mass concentration of 0.15% into the flocculation mixer consecutively; mix the substances for 6 min with a stirrer at the speed of 200 rpm; then guide the mixed solution into a flocculation reactor and stir the solution with a stirrer at the speed of 70 rpm for 40 min of reaction; guide the mixed solution into a settling tank for 50 min of settling.

Fill 500 mL (approximately 375 g) nano-composite NDA-HFO into a jacketed glass adsorption column (100×360 mm). Filter the supernatant obtained through the flocculation and settling processes and guide the filtrate through the nano-composite adsorption bed at the flow rate of 2000 mL/h at the temperature of 10±5° C.; the treatment capacity is kept at 400,000 mL/batch. After the adsorption process, the COD in the effluent is reduced to 59 mg/L, and the chromaticity is reduced to below 20 times.

Consecutively guide 500 mL sodium hydroxide solution with a mass concentration of 10%, 500 mL sodium hydroxide solution with a mass concentration of 3% and 2000 mL tap water through the nano-composite adsorption bed at the flow rate of 500 mL/h at the temperature of 80±5° C. for desorption. The high-concentrated desorption liquid is sent out for incineration or production of coal water slurry, meanwhile the low-concentrated adsorption liquid is used to prepare sodium hydroxide solution for the adsorption process of the next batch.

Embodiment 19

Guide the effluent (COD: 160 mg/L; chromaticity: 80 times) from the secondary sedimentation tank of a coking wastewater bio-treatment plant into a flocculation mixer; add 5 L/m$^3$ polymeric ferric sulfate (PFS) with a mass concentration of 10% and 20 L/m$^3$ polyacrylamide (PAM) with a mass concentration of 0.05% into the flocculation mixer consecutively; mix the substances for 4 min with a stirrer at the speed of 250 rpm; then guide the mixed solution into a flocculation reactor and stir the solution with a stirrer at the speed of 60 rpm for 50 min of reaction; guide the mixed solution into a settling tank for 40 min of settling.

Fill 5 mL (approximately 3.8 g) nano-composite NDA-HMO into a jacketed glass adsorption column (16×160 mm). Filter the supernatant obtained through the flocculation and settling processes and guide the filtrate through the nano-composite adsorption bed at the flow rate of 50 mL/h at the temperature of 10±5° C.; the treatment capacity is kept at 4,000 mL/batch. After the adsorption process, the COD in the effluent is reduced to 61 mg/L, and the chromaticity is reduced to below 20 times.

Consecutively guide 5 mL sodium hydroxide solution with a mass concentration of 6%, 5 mL sodium hydroxide solution with a mass concentration of 1% and 20 mL tap water through the nano-composite adsorption bed at the flow rate of 5 mL/h at the temperature of 45±5° C. for desorption. The high-concentrated desorption liquid is sent out for incineration or production of coal water slurry, meanwhile the low-concentrated adsorption liquid is used to prepare sodium hydroxide solution for the adsorption process of the next batch.

Embodiment 20

Guide the effluent (COD: 160 mg/L; chromaticity: 80 times) from the secondary sedimentation tank of a coking wastewater bio-treatment plant into a flocculation mixer; add 6.5 L/m$^3$ polymeric ferric sulfate (PFS) with a mass concentration of 4% and 20 L/m$^3$ polyacrylamide (PAM) with a mass concentration of 0.15% into the flocculation mixer consecutively; mix the substances for 6 min with a stirrer at the speed of 200 rpm; then guide the mixed solution into a flocculation reactor and stir the solution with a stirrer at the speed of 70 rpm for 40 min of reaction; guide the mixed solution into a settling tank for 50 min of settling.

Fill 10 mL (approximately 7.5 g) nano-composite NDA-HMO into a jacketed glass adsorption column (16×160 mm). Filter the supernatant obtained through the flocculation and settling processes and guide the filtrate through the nano-composite adsorption bed at the flow rate of 100 mL/h at the temperature of 25±5° C.; the treatment capacity is kept at 8,000 mL/batch. After the adsorption process, the COD in the effluent is reduced to 65 mg/L, and the chromaticity is reduced to below 20 times.

Consecutively guide 10 mL sodium hydroxide solution with a mass concentration of 6%, 10 mL sodium hydroxide solution with a mass concentration of 2% and 40 mL tap water through the nano-composite adsorption bed at the flow rate of 10 mL/h at the temperature of 55±5° C. for desorption. The high-concentrated desorption liquid is sent out for incineration or production of coal water slurry, meanwhile the low-concentrated adsorption liquid is used to prepare sodium hydroxide solution for the adsorption process of the next batch.

Embodiment 21

Guide the effluent (COD: 160 mg/L; chromaticity: 80 times) from the secondary sedimentation tank of a coking wastewater bio-treatment plant into a flocculation mixer; add 8 L/m$^3$ polymeric ferric sulfate (PFS) with a mass concentration of 6% and 12 L/m$^3$ polyacrylamide (PAM) with a mass concentration of 0.08% into the flocculation mixer consecutively; mix the substances for 2 min with a stirrer at the speed of 300 rpm; then guide the mixed solution into a flocculation reactor and stir the solution with a stirrer at the speed of 80 rpm for 30 min of reaction; guide the mixed solution into a settling tank for 60 min of settling.

Fill 50 mL (approximately 37.5 g) nano-composite NDA-HFO into a jacketed glass adsorption column (32×260 mm). Filter the supernatant obtained through the flocculation and settling processes and guide the filtrate through the nano-composite adsorption bed at the flow rate of 400 mL/h at the temperature of 20±5° C.; the treatment capacity is kept at 50,000 mL/batch. After the adsorption process, the COD in the effluent is reduced to 64 mg/L, and the chromaticity is reduced to below 20 times.

Consecutively guide 50 mL sodium hydroxide solution with a mass concentration of 8%, 50 mL sodium hydroxide solution with a mass concentration of 2% and 200 mL tap water through the nano-composite adsorption bed at the flow rate of 50 mL/h at the temperature of 60±5° C. for desorption. The high-concentrated desorption liquid is sent out for incineration or production of coal water slurry, meanwhile the low-concentrated adsorption liquid is used to prepare sodium hydroxide solution for the adsorption process of the next batch.

Embodiment 22

Guide the effluent (COD: 160 mg/L; chromaticity: 80 times) from the secondary sedimentation tank of a coking wastewater bio-treatment plant into a flocculation mixer; add 6.5 L/m$^3$ polymeric ferric sulfate (PFS) with a mass concentration of 8% and 8 L/m$^3$ polyacrylamide (PAM) with a mass concentration of 0.12% into the flocculation mixer consecutively; mix the substances for 4 min with a stirrer at the speed of 250 rpm; then guide the mixed solution into a flocculation reactor and stir the solution with a stirrer at the speed of 90 rpm for 30 min of reaction; guide the mixed solution into a settling tank for 50 min of settling.

Fill 100 mL (approximately 75 g) nano-composite NDA-HMO into a jacketed glass adsorption column (32×260 mm). Filter the supernatant obtained through the flocculation and settling processes and guide the filtrate through the nano-composite adsorption bed at the flow rate of 600 mL/h at the temperature of 15±5° C.; the treatment capacity is kept at 80,000 mL/batch. After the adsorption process, the COD in the effluent is reduced to 62 mg/L, and the chromaticity is reduced to below 20 times.

Consecutively guide 100 mL sodium hydroxide solution with a mass concentration of 10%, 100 mL sodium hydroxide solution with a mass concentration of 2% and 400 mL tap water through the nano-composite adsorption bed at the flow rate of 50 mL/h at the temperature of 70±5° C. for desorption. The high-concentrated desorption liquid is sent out for incineration or production of coal water slurry, meanwhile the low-concentrated adsorption liquid is used to prepare sodium hydroxide solution for the adsorption process of the next batch.

Embodiment 23

Guide the effluent (COD: 160 mg/L; chromaticity: 80 times) from the secondary sedimentation tank of a coking wastewater bio-treatment plant into a flocculation mixer; add 25 L/m$^3$ polymeric ferric sulfate (PFS) with a mass concentration of 2% and 5 L/m$^3$ polyacrylamide (PAM) with a mass concentration of 0.2% into the flocculation mixer consecutively; mix the substances for 5 min with a stirrer at the speed of 200 rpm; then guide the mixed solution into a flocculation reactor and stir the solution with a stirrer at the speed of 100 rpm for 30 min of reaction; guide the mixed solution into a settling tank for 60 min of settling.

Fill 200 mL (approximately 150 g) nano-composite NDA-HFO into a jacketed glass adsorption column (64×320 mm). Filter the supernatant obtained through the flocculation and settling processes and guide the filtrate through the nano-composite adsorption bed at the flow rate of 1000 mL/h at the temperature of 20±5° C.; the treatment capacity is kept at 200,000 mL/batch. After the adsorption process, the COD in the effluent is reduced to 66 mg/L, and the chromaticity is reduced to below 20 times.

Consecutively guide 200 mL sodium hydroxide solution with a mass concentration of 8%, 200 mL sodium hydroxide solution with a mass concentration of 3% and 800 mL tap water through the nano-composite adsorption bed at the flow rate of 200 mL/h at the temperature of 75±5° C. for desorption. The high-concentrated desorption liquid is sent out for incineration or production of coal water slurry, meanwhile the low-concentrated adsorption liquid is used to prepare sodium hydroxide solution for the adsorption process of the next batch.

Embodiment 24

Guide the effluent (COD: 160 mg/L; chromaticity: 80 times) from the secondary sedimentation tank of a coking wastewater bio-treatment plant into a flocculation mixer; add 5 L/m$^3$ polymeric ferric sulfate (PFS) with a mass concentration of 10% and 20 L/m$^3$ polyacrylamide (PAM) with a mass concentration of 0.05% into the flocculation mixer consecutively; mix the substances for 4 min with a stirrer at the speed of 250 rpm; then guide the mixed solution into a flocculation reactor and stir the solution with a stirrer at the speed of 60 rpm for 50 min of reaction; guide the mixed solution into a settling tank for 40 min of settling.

Fill 500 mL (approximately 375 g) nano-composite NDA-HMO into a jacketed glass adsorption column (100×360 mm). Filter the supernatant obtained through the flocculation and settling processes and guide the filtrate through the nano-composite adsorption bed at the flow rate of 2000 mL/h at the temperature of 10±5° C.; the treatment capacity is kept at 400,000 mL/batch. After the adsorption process, the COD in the effluent is reduced to 59 mg/L, and the chromaticity is reduced to below 20 times.

Consecutively guide 500 mL sodium hydroxide solution with a mass concentration of 10%, 500 mL sodium hydroxide solution with a mass concentration of 3% and 2000 mL tap water through the nano-composite adsorption bed at the flow rate of 500 mL/h at the temperature of 80±5° C. for desorption. The high-concentrated desorption liquid is sent out for incineration or production of coal water slurry, meanwhile the low-concentrated adsorption liquid is used to prepare sodium hydroxide solution for the adsorption process of the next batch.

Embodiment 25

Guide the effluent (COD: 160 mg/L; chromaticity: 80 times) from the secondary sedimentation tank of a coking wastewater bio-treatment plant into a flocculation mixer; add 10 L/m$^3$ polymeric ferric sulfate (PFS) with a mass concentration of 5% and 10 L/m$^3$ polyacrylamide (PAM) with a mass concentration of 0.1% into the flocculation mixer consecutively; mix the substances for 2 min with a stirrer at the speed of 300 rpm; then guide the mixed solution into a flocculation reactor and stir the solution with a stirrer at the speed of 50 rpm for 60 min of reaction; guide the mixed solution into a settling tank for 30 min of settling.

Fill 200 mL (approximately 150 g) nano-composite NDA-HFO into a jacketed glass adsorption column (64×320 mm). Filter the supernatant obtained through the flocculation and settling processes and guide the filtrate through the nano-composite adsorption bed at the flow rate of 1000 mL/h at the temperature of 20±5° C.; the treatment capacity is kept at 200,000 mL/batch. After the adsorption process, the COD in the effluent is reduced to 66 mg/L, and the chromaticity is reduced to below 20 times.

Consecutively guide 200 mL sodium hydroxide solution with a mass concentration of 8%, 200 mL sodium hydroxide solution with a mass concentration of 3% and 800 mL tap water through the nano-composite adsorption bed at the flow rate of 200 mL/h at the temperature of 75±5° C. for desorption. The high-concentrated desorption liquid is sent out for incineration or production of coal water slurry, meanwhile the low-concentrated adsorption liquid is used to prepare sodium hydroxide solution for the adsorption process of the next batch.

Embodiment 26

Guide the effluent (COD: 160 mg/L; chromaticity: 80 times) from the secondary sedimentation tank of a coking wastewater bio-treatment plant into a flocculation mixer; add 12 L/m$^3$ polymeric ferric sulfate (PFS) with a mass concentration of 4% and 6.5 L/m$^3$ polyacrylamide (PAM) with a mass concentration of 0.15% into the flocculation mixer consecutively; mix the substances for 6 min with a stirrer at the speed of 200 rpm; then guide the mixed solution into a flocculation reactor and stir the solution with a stirrer at the speed of 70 rpm for 40 min of reaction; guide the mixed solution into a settling tank for 50 min of settling.

Fill 5 mL (approximately 3.8 g) nano-composite NDA-HMO into a jacketed glass adsorption column (16×160 mm). Filter the supernatant obtained through the flocculation and settling processes and guide the filtrate through the nano-composite adsorption bed at the flow rate of 50 mL/h at the temperature of 10±5° C.; the treatment capacity is kept at 4,000 mL/batch. After the adsorption process, the COD in the effluent is reduced to 61 mg/L, and the chromaticity is reduced to below 20 times.

Consecutively guide 5 mL sodium hydroxide solution with a mass concentration of 6%, 5 mL sodium hydroxide solution with a mass concentration of 1% and 20 mL tap water through the nano-composite adsorption bed at the flow rate of 5 mL/h at the temperature of 45±5° C. for desorption. The high-concentrated desorption liquid is sent out for incineration or production of coal water slurry, meanwhile the low-concentrated adsorption liquid is used to prepare sodium hydroxide solution for the adsorption process of the next batch.

Embodiment 27

Guide the effluent (COD: 160 mg/L; chromaticity: 80 times) from the secondary sedimentation tank of a coking wastewater bio-treatment plant into a flocculation mixer; add 8 L/m$^3$ polymeric ferric sulfate (PFS) with a mass concentration of 6% and 12 L/m$^3$ polyacrylamide (PAM) with a mass concentration of 0.08% into the flocculation mixer consecutively; mix the substances for 2 min with a stirrer at the speed of 300 rpm; then guide the mixed solution into a flocculation reactor and stir the solution with a stirrer at the speed of 80 rpm for 30 min of reaction; guide the mixed solution into a settling tank for 60 min of settling.

Fill 10 mL (approximately 7.5 g) nano-composite NDA-HFO into a jacketed glass adsorption column (16×160 mm). Filter the supernatant obtained through the flocculation and settling processes and guide the filtrate through the nano-composite adsorption bed at the flow rate of 100 mL/h at the temperature of 25±5° C.; the treatment capacity is kept at 8,000 mL/batch. After the adsorption process, the COD in the effluent is reduced to 65 mg/L, and the chromaticity is reduced to below 20 times.

Consecutively guide 10 mL sodium hydroxide solution with a mass concentration of 6%, 10 mL sodium hydroxide solution with a mass concentration of 2% and 40 mL tap water through the nano-composite adsorption bed at the flow rate of 10 mL/h at the temperature of 55±5° C. for desorption. The high-concentrated desorption liquid is sent out for incineration or production of coal water slurry, meanwhile the low-concentrated adsorption liquid is used to prepare sodium hydroxide solution for the adsorption process of the next batch.

Embodiment 28

Guide the effluent (COD: 160 mg/L; chromaticity: 80 times) from the secondary sedimentation tank of a coking wastewater bio-treatment plant into a flocculation mixer; add 6.5 L/m$^3$ polymeric ferric sulfate (PFS) with a mass concentration of 8% and 8 L/m$^3$ polyacrylamide (PAM) with a mass concentration of 0.12% into the flocculation mixer consecutively; mix the substances for 4 min with a stirrer at the speed of 250 rpm; then guide the mixed solution into a flocculation reactor and stir the solution with a stirrer at the speed of 90 rpm for 30 min of reaction; guide the mixed solution into a settling tank for 50 min of settling.

Fill 50 mL (approximately 37.5 g) nano-composite NDA-HFO into a jacketed glass adsorption column (32×260 mm). Filter the supernatant obtained through the flocculation and settling processes and guide the filtrate through the nano-composite adsorption bed at the flow rate of 400 mL/h at the temperature of 20±5° C.; the treatment capacity is kept at 50,000 mL/batch. After the adsorption process, the COD in the effluent is reduced to 64 mg/L, and the chromaticity is reduced to below 20 times.

Consecutively guide 50 mL sodium hydroxide solution with a mass concentration of 8%, 50 mL sodium hydroxide solution with a mass concentration of 2% and 200 mL tap water through the nano-composite adsorption bed at the flow rate of 50 mL/h at the temperature of 60±5° C. for desorption. The high-concentrated desorption liquid is sent out for incineration or production of coal water slurry, meanwhile the low-concentrated adsorption liquid is used to prepare sodium hydroxide solution for the adsorption process of the next batch.

Embodiment 29

Guide the effluent (COD: 160 mg/L; chromaticity: 80 times) from the secondary sedimentation tank of a coking wastewater bio-treatment plant into a flocculation mixer; add 25 L/m$^3$ polymeric ferric sulfate (PFS) with a mass concentration of 2% and 5 L/m$^3$ polyacrylamide (PAM) with a mass concentration of 0.2% into the flocculation mixer consecutively; mix the substances for 5 min with a stirrer at the speed of 200 rpm; then guide the mixed solution into a flocculation reactor and stir the solution with a stirrer at the speed of 100 rpm for 30 min of reaction; guide the mixed solution into a settling tank for 60 min of settling.

Fill 100 mL (approximately 75 g) nano-composite NDA-HFO into a jacketed glass adsorption column (32×260 mm). Filter the supernatant obtained through the flocculation and settling processes and guide the filtrate through the nano-composite adsorption bed at the flow rate of 600 mL/h at the temperature of 15±5° C.; the treatment capacity is kept at 80,000 mL/batch. After the adsorption process, the COD in the effluent is reduced to 62 mg/L, and the chromaticity is reduced to below 20 times.

Consecutively guide 100 mL sodium hydroxide solution with a mass concentration of 10%, 100 mL sodium hydroxide solution with a mass concentration of 2% and 400 mL tap water through the nano-composite adsorption bed at the flow rate of 100 mL/h at the temperature of 70±5° C. for desorption. The high-concentrated desorption liquid is sent out for incineration or production of coal water slurry, meanwhile the low-concentrated adsorption liquid is used to prepare sodium hydroxide solution for the adsorption process of the next batch.

Embodiment 30

Guide the effluent (COD: 160 mg/L; chromaticity: 80 times) from the secondary sedimentation tank of a coking wastewater bio-treatment plant into a flocculation mixer; add 10 L/m$^3$ polymeric ferric sulfate (PFS) with a mass concentration of 5% and 10 L/m$^3$ polyacrylamide (PAM) with a mass concentration of 0.1% into the flocculation mixer consecutively; mix the substances for 2 min with a stirrer at the speed of 300 rpm; then guide the mixed solution into a flocculation reactor and stir the solution with a stirrer at the speed of 50 rpm for 60 min of reaction; guide the mixed solution into a settling tank for 30 min of settling.

Fill 500 mL (approximately 375 g) nano-composite NDA-HFO into a jacketed glass adsorption column (100×360 mm). Filter the supernatant obtained through the flocculation and settling processes and guide the filtrate through the nano-composite adsorption bed at the flow rate of 2000 mL/h at the temperature of 10±5° C.; the treatment capacity is kept at 400,000 mL/batch. After the adsorption process, the COD in the effluent is reduced to 59 mg/L, and the chromaticity is reduced to below 20 times.

Consecutively guide 500 mL sodium hydroxide solution with a mass concentration of 10%, 500 mL sodium hydroxide solution with a mass concentration of 3% and 2000 mL tap water through the nano-composite adsorption bed at the flow rate of 500 mL/h at the temperature of 80±5° C. for desorption. The high-concentrated desorption liquid is sent out for incineration or production of coal water slurry, meanwhile the low-concentrated adsorption liquid is used to prepare sodium hydroxide solution for the adsorption process of the next batch.

Embodiment 31

Guide the effluent (COD: 160 mg/L; chromaticity: 80 times) from the secondary sedimentation tank of a coking wastewater bio-treatment plant into a flocculation mixer; add 8 L/m$^3$ polymeric ferric sulfate (PFS) with a mass concentration of 6% and 12 L/m$^3$ polyacrylamide (PAM) with a mass concentration of 0.08% into the flocculation mixer consecutively; mix the substances for 2 min with a stirrer at the speed of 300 rpm; then guide the mixed solution into a flocculation reactor and stir the solution with a stirrer at the speed of 80 rpm for 30 min of reaction; guide the mixed solution into a settling tank for 60 min of settling.

Fill 5 mL (approximately 3.8 g) nano-composite NDA-HFO into a jacketed glass adsorption column (16×160 mm). Filter the supernatant obtained through the flocculation and settling processes and guide the filtrate through the nano-composite adsorption bed at the flow rate of 50 mL/h at the temperature of 10±5° C.; the treatment capacity is kept at 4,000 mL/batch. After the adsorption process, the COD in the effluent is reduced to 61 mg/L, and the chromaticity is reduced to below 20 times.

Consecutively guide 5 mL sodium hydroxide solution with a mass concentration of 6%, 5 mL sodium hydroxide solution with a mass concentration of 1% and 20 mL tap water through the nano-composite adsorption bed at the flow rate of 5 mL/h at the temperature of 45±5° C. for desorption. The high-concentrated desorption liquid is sent out for incineration or production of coal water slurry, meanwhile the low-concentrated adsorption liquid is used to prepare sodium hydroxide solution for the adsorption process of the next batch.

Embodiment 32

Guide the effluent (COD: 160 mg/L; chromaticity: 80 times) from the secondary sedimentation tank of a coking wastewater bio-treatment plant into a flocculation mixer; add 6.5 L/m$^3$ polymeric ferric sulfate (PFS) with a mass concentration of 8% and 8 L/m$^3$ polyacrylamide (PAM) with a mass concentration of 0.12% into the flocculation mixer consecutively; mix the substances for 4 min with a stirrer at the speed of 250 rpm; then guide the mixed solution into a flocculation reactor and stir the solution with a stirrer at the speed of 90 rpm for 30 min of reaction; guide the mixed solution into a settling tank for 50 min of settling.

Fill 10 mL (approximately 7.5 g) nano-composite NDA-HMO into a jacketed glass adsorption column (16×160 mm). Filter the supernatant obtained through the flocculation and settling processes and guide the filtrate through the nano-composite adsorption bed at the flow rate of 100 mL/h at the temperature of 25±5° C.; the treatment capacity is kept at 8,000 mL/batch. After the adsorption process, the COD in the effluent is reduced to 65 mg/L, and the chromaticity is reduced to below 20 times.

Consecutively guide 10 mL sodium hydroxide solution with a mass concentration of 6%, 10 mL sodium hydroxide solution with a mass concentration of 2% and 40 mL tap water through the nano-composite adsorption bed at the flow rate of 10 mL/h at the temperature of 55±5° C. for desorption. The high-concentrated desorption liquid is sent out for incineration or production of coal water slurry, meanwhile the low-concentrated adsorption liquid is used to prepare sodium hydroxide solution for the adsorption process of the next batch.

Embodiment 33

Guide the effluent (COD: 160 mg/L; chromaticity: 80 times) from the secondary sedimentation tank of a coking wastewater bio-treatment plant into a flocculation mixer; add 25 L/m$^3$ polymeric ferric sulfate (PFS) with a mass concentration of 2% and 5 L/m$^3$ polyacrylamide (PAM) with a mass concentration of 0.2% into the flocculation mixer consecutively; mix the substances for 5 min with a stirrer at the speed of 200 rpm; then guide the mixed solution into a flocculation reactor and stir the solution with a stirrer at the speed of 100 rpm for 30 min of reaction; guide the mixed solution into a settling tank for 60 min of settling.

Fill 50 mL (approximately 37.5 g) nano-composite NDA-P into a jacketed glass adsorption column (32×260 mm). Filter the supernatant obtained through the flocculation and settling processes and guide the filtrate through the nano-composite adsorption bed at the flow rate of 400 mL/h at the temperature of 20±5° C.; the treatment capacity is kept at 50,000 mL/batch. After the adsorption process, the COD in the effluent is reduced to 64 mg/L, and the chromaticity is reduced to below 20 times.

Consecutively guide 50 mL sodium hydroxide solution with a mass concentration of 8%, 50 mL sodium hydroxide solution with a mass concentration of 2% and 200 mL tap water through the nano-composite adsorption bed at the flow rate of 50 mL/h at the temperature of 60±5° C. for desorption. The high-concentrated desorption liquid is sent out for incineration or production of coal water slurry, meanwhile the low-concentrated adsorption liquid is used to prepare sodium hydroxide solution for the adsorption process of the next batch.

Embodiment 34

Guide the effluent (COD: 160 mg/L; chromaticity: 80 times) from the secondary sedimentation tank of a coking wastewater bio-treatment plant into a flocculation mixer; add 6.5 L/m$^3$ polymeric ferric sulfate (PFS) with a mass concentration of 8% and 8 L/m$^3$ polyacrylamide (PAM) with a mass concentration of 0.12% into the flocculation mixer consecutively; mix the substances for 4 min with a stirrer at the speed of 250 rpm; then guide the mixed solution into a flocculation reactor and stir the solution with a stirrer at the speed of 90 rpm for 30 min of reaction; guide the mixed solution into a settling tank for 50 min of settling.

Fill 5 mL (approximately 3.8 g) nano-composite NDA-HFO into a jacketed glass adsorption column (16×160 mm). Filter the supernatant obtained through the flocculation and settling processes and guide the filtrate through the nano-composite adsorption bed at the flow rate of 50 mL/h at the temperature of 10±5° C.; the treatment capacity is kept at 4,000 mL/batch. After the adsorption process, the COD in the effluent is reduced to 61 mg/L, and the chromaticity is reduced to below 20 times.

Consecutively guide 5 mL sodium hydroxide solution with a mass concentration of 6%, 5 mL sodium hydroxide solution with a mass concentration of 1% and 40 mL tap water through the nano-composite adsorption bed at the flow rate of 5 mL/h at the temperature of 45±5° C. for desorption. The high-concentrated desorption liquid is sent out for incineration or production of coal water slurry, meanwhile the low-concentrated adsorption liquid is used to prepare sodium hydroxide solution for the adsorption process of the next batch.

Embodiment 35

Guide the effluent (COD: 160 mg/L; chromaticity: 80 times) from the secondary sedimentation tank of a coking wastewater bio-treatment plant into a flocculation mixer; add 25 L/m$^3$ polymeric ferric sulfate (PFS) with a mass concentration of 2% and 5 L/m$^3$ polyacrylamide (PAM) with a mass concentration of 0.2% into the flocculation mixer consecutively; mix the substances for 5 min with a stirrer at the speed of 200 rpm; then guide the mixed solution into a flocculation reactor and stir the solution with a stirrer at the speed of 100 rpm for 30 min of reaction; guide the mixed solution into a settling tank for 60 min of settling.

Fill 10 mL (approximately 7.5 g) nano-composite NDA-HMO into a jacketed glass adsorption column (16×160 mm). Filter the supernatant obtained through the flocculation and settling processes and guide the filtrate through the nano-composite adsorption bed at the flow rate of 100 mL/h at the temperature of 25±5° C.; the treatment capacity is kept at 8,000 mL/batch. After the adsorption process, the COD in the effluent is reduced to 65 mg/L, and the chromaticity is reduced to below 20 times.

Consecutively guide 10 mL sodium hydroxide solution with a mass concentration of 6%, 10 mL sodium hydroxide solution with a mass concentration of 2% and 40 mL tap water through the nano-composite adsorption bed at the flow rate of 10 mL/h at the temperature of 55±5° C. for desorption. The high-concentrated desorption liquid is sent out for incineration or production of coal water slurry, meanwhile the low-concentrated adsorption liquid is used to prepare sodium hydroxide solution for the adsorption process of the next batch.

What is claimed is:
1. A method for removing a pollutant from a bio-treated coking wastewater, comprising:
  (A) feeding an effluent from a coking wastewater treatment plant to a flocculation mixer, adding a flocculant comprising polymeric ferric sulfate and polyacrylamide into the flocculation mixer, and mixing the flocculant with the effluent thoroughly to obtain a first solution;
  (B) feeding the first solution obtained from step (A) into a flocculation reactor for flocculation reaction and obtaining a second solution;

(C) feeding the second solution from the flocculation reaction in step (B) into a settling tank so that the second solution separates into a solid precipitate and a supernate;

(D) filtering the supernate obtained in step (C) to obtain a first filtrate, feeding the first filtrate to an adsorption column packed with a nano-composite material to obtain a second filtrate;

(E) when a concentration of the pollutant in the second filtrate reaches a pre-determined breakthrough point, starting a desorption process, wherein the desorption process comprises stopping feeding the first filtrate into the adsorption column, feeding a first sodium hydroxide solution having a first sodium hydroxide concentration through the adsorption column to obtain a first desorption liquid, and then feeding a second sodium hydroxide solution having a second sodium hydroxide concentration to obtain a second desorption liquid, wherein the first sodium hydroxide concentration is higher than the second sodium hydroxide concentration, wherein the first desorption liquid has a higher concentration of the pollutant and the second desorption liquid has a lower concentration of the pollutant;

(F) incinerating the first desorption liquid or mixing the first desorption liquid in a coal slurry.

2. The method according to claim 1, wherein the polymeric ferric sulfate is in a polymeric ferric sulfate solution having 2-10% in weight of the polymeric ferric sulfate and the polyacrylamide is in a polyacrylamide solution having 0.05-0.2% in weight of the polyacrylamide.

3. The method according to claim 2, wherein in step (A) a dosage of the polymeric ferric sulfate solution is 5-25 L/m$^3$ and that of the polyacrylamide solution is 5-20 L/m$^3$.

4. The method according to claim 1, wherein in step (A) a rotational speed of a stirrer in the flocculation mixer is 200-300 rpm, and a mixing time is 2-6 min.

5. The method according to claim 1 wherein in step (B) a rotational speed of a stirrer in the flocculation reactor is 50-100 rpm, and a mixing time is 20-60 min.

6. The method according to claim 1, wherein in step (C) a settling time in the settling tank is 30-60 min.

7. The method according to claim 1, wherein in step (D) the supernate passes the adsorption column filled with the nano-composite material at a flow rate of 4-10 bed volume per hour at the temperature of 5-35° C.

8. The method according to claim 7, wherein each of the nano-composite material comprises a matrix of quaternized spherical polystyrene having iron oxide particles, or manganese oxide particles, or both loaded thereon.

9. The method according to claim 7, wherein in step (E) the desorption process commences after 500-1000 BV (bed volume) of the second filtrate passes through the adsorption column.

10. The method according to claim 1, wherein the first sodium hydroxide concentration is a mass concentration of 6-10% and the second sodium hydroxide concentration is a mass concentration of 1-3%.

11. The method according to claim 1, wherein the desorption process is conducted at a flow rate of 0.5-2 bed volume per hour and a temperature of 40-85° C.

12. The method according to claim 1, wherein the pollutant comprises one or more of ammonia, nitrogen, cyanides, thiocyanides, phenols, polycyclic aromatic hydrocarbons, or heterocyclic compounds having nitrogen, oxygen, or sulfur.

13. The method according to claim 1, wherein a concentration of the pollutant in the effluent from the coking wastewater treatment plant is about 160 mg/L in chemical oxygen demand (COD) and 80 times in chromaticity.

14. The method according to claim 1, wherein a concentration of the pollutant in the second filtrate is about 60-70 mg/L in chemical oxygen demand (COD) and lower than 20 times in chromaticity.

* * * * *